Nov. 10, 1970   T. A. COHEN ET AL   3,539,921
SIMPLIFIED INTEGRATING MOTOR
Filed Nov. 6, 1967

INVENTORS:
HUGH E. RIORDAN
THEODORE A. COHEN
BY
ATTORNEY

United States Patent Office 3,539,921
Patented Nov. 10, 1970

3,539,921
SIMPLIFIED INTEGRATING MOTOR
Theodore A. Cohen, Bronx, N.Y., and Hugh E. Riordan, Wyckoff, N.J., assignors to Singer-General Precision, Inc., Little Falls, N.J., a corporation of Delaware
Filed Nov. 6, 1967, Ser. No. 680,866
Int. Cl. H03k 13/00; G21d 7/02; G01r 19/26
U.S. Cl. 324—93                                      5 Claims

ABSTRACT OF THE DISCLOSURE

A toroidal container disposed in a defined plane, with a conducting fluid having a bead of non-conducting material therein; a magnetic field generator disposed so as to create a magnetic field at right angles to said defined plane; and sensing means disposed at a sensing station next to the toroidal container adapted to sense the passage of said bead past said station, whereby the number of times said bead rotates around said toroidal container past said station during a time interval is a digital count of the applied voltage over said time interval.

BACKGROUND OF THE INVENTION

Field of the invention

The present invention relates to an integrator, and more particularly to an integrator which supplies a digital output in the form of a pulse count.

Description of the prior art

In many data processing systems, including inertial guidance, navigation and control systems, it is necessary to obtain the precise time integral of an electrical D.C. voltage. Such a voltage may represent the output of a gyroscope, accelerometer or other sensing instrument, or the output of a computing device or signal generator. The most precise method of time integration consists of counting a series of pulses or signal alternations, when the frequency of the pulses or alternations is proportional to the quantity (e.g., voltage) to be integrated.

In addition, a signal containing information in the form of suppressed carrier frequency modulation is easily accepted by most types of digital computer.

Therefore, devices capable of precisely converting a voltage into a pulse train or other cyclical form in which the frequency is equal to the product of a constant by the applied voltages are in constant demand.

Previously, such devices have been either relatively inaccurate or excessively expensive and complicated. For example, a fixed field D.C. motor having a non-magnetic rotating armature will run at a speed which is closely proportional to the applied voltage. If a photoelectric, magnetic or other type of pulse or A.C. signal generator is coupled to the motor shaft, the frequency of the output signal will be proportional to the motor speed and hence to the voltage applied to the motor. The magnitude of the deviation from perfectly linear proportionality depends on the size and stability of the following parameters or effects:

(1) Constancy of armature resistance
(2) Constancy of brush-commutator resistance
(3) Constancy and linearity of speed-variable friction
(4) Magnitude of non-speed variable friction
(5) Demagnetization effect of armature current
(6) Constancy of fixed field These effects can be reduced by careful design and construction, but even with the greatest care the sum of these errors will amount to 0.5% to 1% referred to full scale. The friction alone contributes an error of 0.25% of full scale. For critical applications, a total error of 0.01% to 0.005% of input with a zero threshold (null) between one part in $10^5$ and one part in $10^6$ of full scale is required.

In addition to high precision for steady-state inputs, a good voltage-to-frequency converter must have a rapid response to a varying input signal.

Therefore, it is the object of the present invention to eliminate or greatly reduce the errors associated with mechanical friction, and brushes and commutators, while at the same time improving reliability and reducing cost.

SUMMARY OF THE INVENTION

Generally speaking the integrator of the present invention comprises a toroidal container filled with a conducting fluid, e.g., mercury with a bead of non-conducting material therein. The toroidal container is disposed so that one portion thereof is in a magnetic field and a D.C. current is passed across the toroidal container at right angles to the magnetic field. This will cause the liquid and bead to flow around the toroid at a velocity corresponding approximately to the voltage drop between electrodes. Sensing means detect each time the bead passes before a sensing station. The number of times the bead rotates around during a time interval is a digital count of the applied voltage over the time interval.

The invention as well as other objects and advantages thereof will become apparent from the following description taken in conjunction with the accompanying drawing.

DETAILED DESCRIPTION

Figure 1:
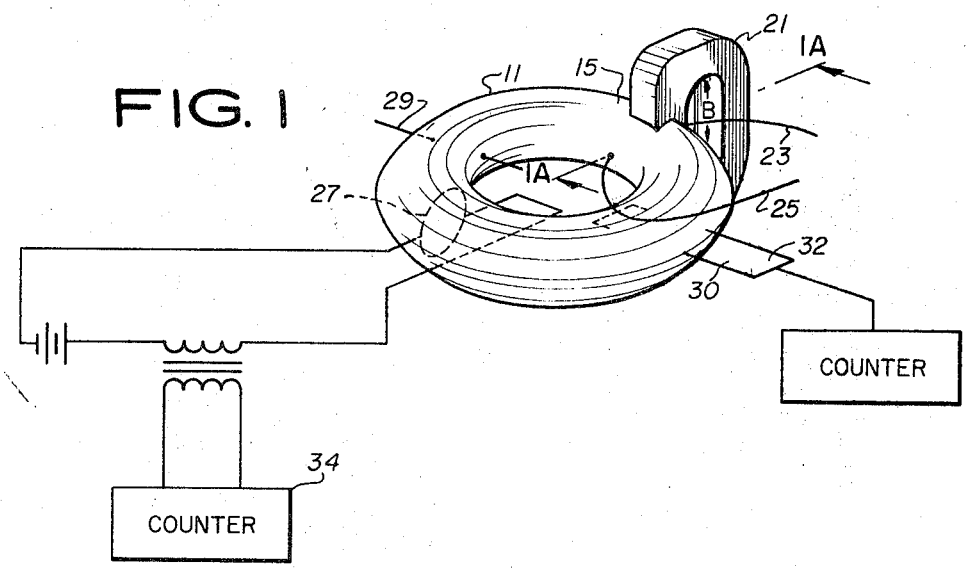
FIG. 1 is a perspective view of the integrator herein contemplated.
Figure 1A:
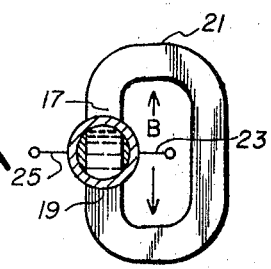
FIG. 1A is a cross sectional view along lines 1A—1A of FIG. 1.
Figure 2:
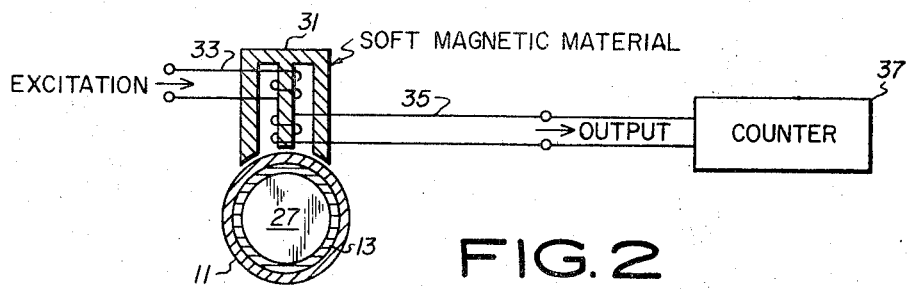
FIG. 2 is a cross sectional view of a modified form of the integrator shown in FIG. 1.

Shown in FIG. 1 is a toroidal container 11 filled with a conducting fluid 13, e.g., mercury or sodium-potassium alloy. A portion 15 of toroidal container 11 is placed between the north and south poles 17 and 19 of magnet 21. Electrodes 23 and 25 are disposed at right angles to the magnetic field B at opposite sides of container 11. Within the container 11 is a bead 27 made of non-conducting material of a density closely approximating that of the liquid. Disposed at various stations around the container 11 are sensing electrodes 29, and/or photocells 30. When a toroidal container filled with a conducting liquid such as mercury or sodium-potassium alloy, is crossed by a magnetic field in the vicinity of a pair of conducting electrodes as shown in FIG. 1, a current passed between the electrodes through the liquid will cause the liquid to flow around the torus with an average velocity closely related to the voltage drop between the electrodes. The output of the sensing electrodes 29 and/or photocells 30 are counted in counters 32 and 34. The relation between average velocity of the liquid and the applied voltage may be made as nearly linear as is desired by careful design of the fluid path, the magnetic circuit and the electrodes. With the bead of non-conducting material of a density closely approximating that of the liquid, placed in the toroidal container, the speed of the liquid flow may be determined by measuring the number of times the bead passes a fixed point per unit time. The total count of passages is thus the time integral of the speed and hence proportional to the time integral of the applied voltage. The passage of the bead may be sensed by placing one or more pairs of electrodes around the toroidal container as shown in FIG. 1 and sensing the change of resistance between the electrodes as the bead passes. Alternatively the change in bulk resistivity of the contents of the toroidal container which occurs as the bead passes, may be sensed by measuring the change in impedance reflected to the terminals of an induction coil placed near the toroidal container as shown in FIG. 2. Shown in FIG. 2 is a cross sectional view of the excitation and pick off arrangement.

Container 11 with the liquid 13 and bead 27 is the same as in FIG. 1. The magnet 31 is of the E-bridge type having an excitation coil 33 and an output coil 35 wound on the center leg. Each time the bead 27 passes before the magnet, a change in impedance will take place across output coil 35 to a counter 37.

It is to be observed therefore that the present invention provides for a toroidal container 11 disposed in a defined plane with a conducting fluid 13 having a bead 27 of non-conducting material therein; a magnetic field generator 21 is disposed so as to create a magnetic field at right angles to said defined plane. Sensing means 29 and 30 are disposed at a sensing station next to the toroidal container which are adapted to sense the passage of bead 27 past the station. The number of times the bead rotates around the toroidal container past the station during a time interval is a digital count of the applied voltage over said time interval. The field generator may be a horseshoe magnet 21 with inwardly facing poles 17 and 19 disposed so that the pole faces lie parallel to the defined plane, the magnetic field thus passing between poles at right angles to the defined plane. The sensing means may be sensing electrodes 29 passing a small current across the toroidal container which is interrupted by the passage of the bead 27 and counter means 34 coupled to the sensing electrodes counting the times the current has been so interrupted; or, the sensing means may be a photocell 30 providing an output when light flowing thereto is interrupted by the passage of said bead and counter means 32 coupled to said photocell counting the number of such interruptions. The sensing means and magnetic field generator may be combined as an E-bridge 31 having an excitation coil 33 and an output coil 35 wound around the center leg thereof with counter means coupled to the output coil counting the changes in impedance across the output coil, each time the bead passes before the center leg.

While the present invention has been described in preferred embodiments, it will be obvious to those skilled in the art that various modifications can be made therein within the scope of the invention, and it is intended that the appended claims cover all such modifications.

What is claimed is:

1. Apparatus for obtaining the time integral of an applied voltage comprising:
a toroidal container disposed in a defined plane, said container having a conducting fluid disposed therein, said conducting fluid including a bead of non-conducting material; a magnetic field generator disposed relative to said container so as to create a magnetic field at right angles to said defined plane; and a pair of electrodes coupled across said toroidal container in the vicinity of said magnetic field generator whereby said conducting fluid will be caused to flow around the torus defined by said container in response to said applied voltage being impressed across said pair of electrodes; said apparatus further including sensing means disposed at a sensing station adjacent to the toroidal container for detecting the passage of said bead past said station, and counter means responsive to said sensing means for recording the number of times said bead rotates around said toroidal container past said station during a predetermined time interval whereby the output of said counter means is proportional to the integral of the applied voltage over said predetermined time interval.

2. The apparatus claimed in claim 1, said magnetic field generator being a horseshoe magnet with inwardly facing poles disposed so that the pole faces lie parallel to said defined plane, the magnetic field passing between poles at right angles to said defined plane.

3. Apparatus as claimed in claim 1 wherein said sensing means comprises a pair of spaced electrodes for passing a small current across said toroidal container which current is interrupted by the passage of said bead, said counter means being responsively coupled to said spaced electrodes for counting the times the current has been so interrupted.

4. The apparatus as claimed in claim 1 wherein said sensing means includes at least one photocell for providing an output when light flowing thereto is interrupted by the passage of said bead, said counter means being responsively coupled to said photocell for counting the number of such interruptions.

5. The apparatus as claimed in claim 1 wherein said sensing means and said magnetic field generator are combined in the form of an E-bridge pick off having an excitation coil and an output coil wound around the center leg thereof, said counter being responsively coupled to said output coil for counting the changes in impedance across the output coil each time said bead passes said sensing station.

References Cited

UNITED STATES PATENTS

| 338,588 | 3/1886 | De Ferranti | 324—93 |
| 1,157,926 | 10/1915 | Davis | 324—93 |
| 3,333,189 | 7/1967 | Barkan et al. | 324—76 |
| 3,397,330 | 8/1968 | Eiichi Hori et al. | 310—11 |

MAYNARD R. WILBUR, Primary Examiner

J. M. THESZ, Jr., Assistant Examiner

U.S. Cl. X.R.

235—92; 310—11; 340—347